Patented Apr. 26, 1938

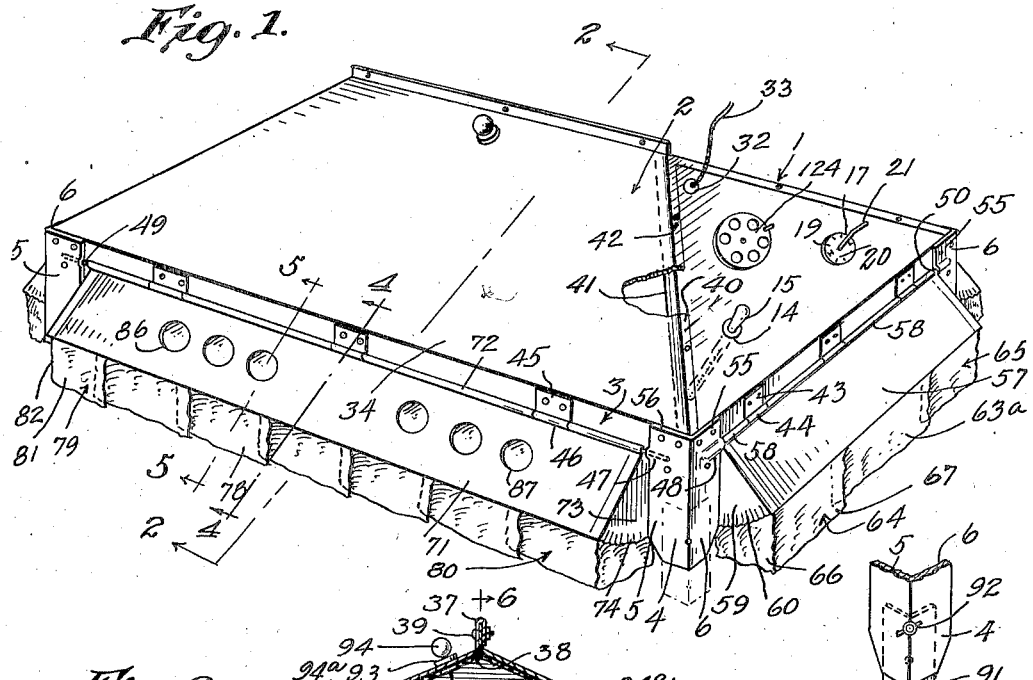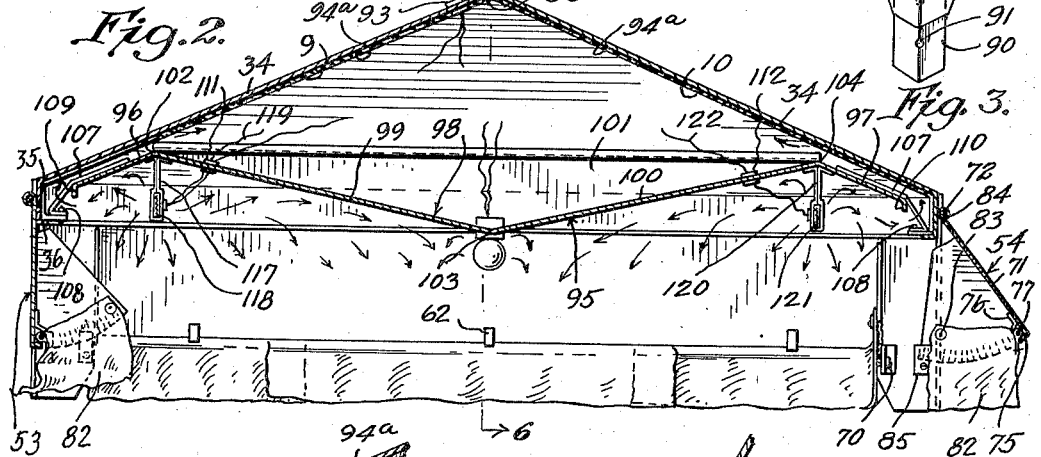

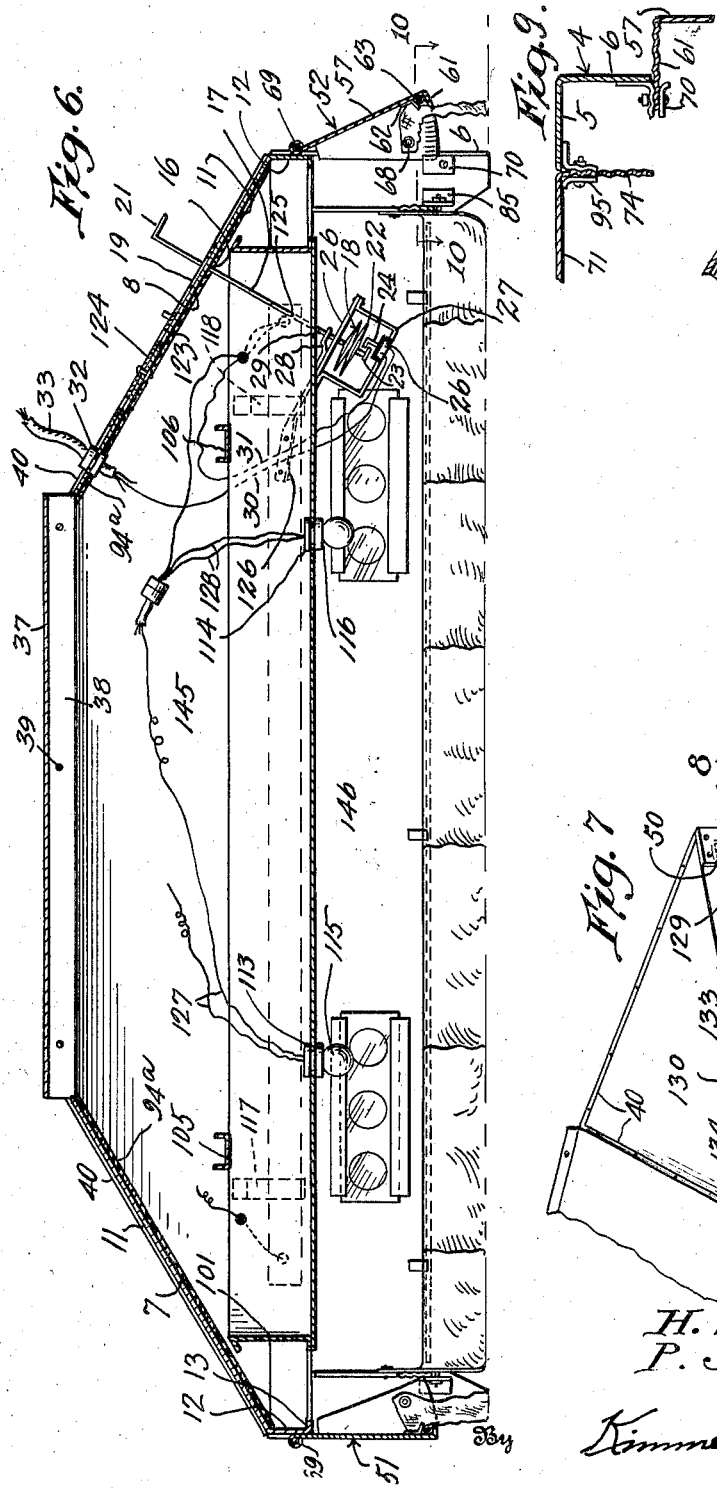

2,115,617

UNITED STATES PATENT OFFICE 2,115,617

ELECTRIC BROODER

Howard S. Brembeck, North Manchester, and Paul J. Speicher, Urbana, Ind., assignors to The Cyclone Manufacturing Co., Urbana, Ind.

Application August 7, 1936, Serial No. 94,866

9 Claims. (Cl. 119—33)

This invention relates to an electric brooder.

It is well known that the matter of increasing the brooding area has been a problem for poultrymen for some time when using an electric brooder. Of course, as one appreciates baby chicks one day old take up considerably less space than they will when they are six weeks old. The user of the electric brooder was penalized either by having to buy too large a brooder or by using a brooder for the large chicks, that was really too small to accommodate them. It is one of the aims of this invention to provide, in a manner as hereinafter set forth, an electric brooder having means for increasing the brooding area, under the brooder, for the chicks as they grow larger to provide for the use of a single brooder for small and large chicks, thereby overcoming the objection heretofore referred to.

The invention further aims to provide, in a manner as hereinafter set forth, an electric brooder having means at its sides and ends for increasing the brooding area under the brooder when occasion requires, and with such means enabling easy access, when desired, to the space under the brooder.

The invention further aims to provide, in a manner as hereinafter set forth, an electric brooder including heating elements so disposed as to cause uniform heat under the entire brooder.

The invention further aims to provide, in a manner as hereinafter set forth, an electric brooder including heating elements and an inner canopy so formed and arranged relative to the heating elements as to provide for the heated air following the roof of the inner canopy from said elements to be forced down at the middle of the canopy where the heated air naturally breaks and causes a heated air current which returns again to the heating elements, or rather makes a complete cycle to provide for heated air circulation under the hover for the chicks.

The invention further aims to provide, in a manner as hereinafter set forth, an electric brooder including a roof or outer canopy and an inner canopy so related as to provide an air space between the inner and outer canopy which acts as an insulator and exhaust for bad air from the brooding area.

The invention further aims to provide, in a manner as hereinafter set forth, an electric brooder having means whereby heat is provided at the ends, at the corners and between the sides, ends and corners in a uniform manner whereby uniform heat is provided to all areas under the brooder.

The invention further aims to provide, in a manner as hereinafter set forth, an electric brooder constructed to provide adequate insulation for the brooding area.

The invention further aims to provide, in a manner as hereinafter set forth, an electric brooder which is simple in its construction and arrangement, strong, durable, adjustable to increase the height thereof, readily assembled, thoroughly efficient in its use, conveniently repaired when occasion requires, and comparatively inexpensive to manufacture.

To the above ends and to others which may hereinafter appear, the invention consists of the novel construction, combination and arrangement of parts as will be more specifically referred to and are as illustrated in the accompanying drawings wherein is shown an embodiment of the invention, but it is to be understood that changes, variations and modifications may be resorted to which fall within the scope of the invention as claimed.

In the drawings:—

Figure 1 is a perspective view of the brooder illustrated as adjusted to provide an increase in the brooding area, Figure 2 is a section on line 2—2, Figure 1, Figure 3 is a fragmentary view illustrating the form of means employed for vertically adjusting the brooder, Figure 4 is a fragmentary view in transverse section on line 4—4, Figure 1, Figure 5 is a section on line 5—5, Figure 1, Figure 6 is a section on line 6—6, Figure 2, Figure 7 is a fragmentary view of a modified form, Figure 8 is a section on line 8—8, Figure 7, Figure 9 is a section on line 10—10, Figure 6, and Figure 10 is a section on line 11—11, Figure 4.

A brooder, in accordance with this invention, includes a canopy 1 of any suitable contour and plan, preferably rectangular, and is so shown. The canopy is constructed from sheet metal of the desired gauge and has its sides of greater length than its ends. The canopy includes a hollow, upper portion 2, a hollow, rectangular lower portion 3 and corner posts 4 of angle shape in sectional plan to form a pair of legs 5, 6 disposed at right angles to each other. The upper portion 2 is of substantially wedge-shaped contour in lengthwise and transverse sections.

The upper portion 2 preferably is formed from four sheet metal sections 7, 8, 9 and 10. The section 7, as well as section 8, is formed of a triangular-shaped portion 11 merging at its base into a depending vertically disposed rectangular flange 12 formed at its bottom with an inset part 13. The sections 7, 8 are oppositely disposed and the portion 11 of each of said sections extends upwardly at an inclination from a flange 12. The triangular-shaped portion 11 of the section 8 is formed with an opening 14 for the entrance of a thermometer 15 into the upper portion of the canopy. The triangular-shaped portion 11 of the section 8 has an opening 16 for the passage of the setting stem 17 of a thermostatic controlling structure 18. Secured upon the outer face of the portion 11 of the section 8 is an apertured disc 19 having its outer face provided with a temperature setting scale 20. The stem 17 extends through the disc 19 and has at its outer end a right angularly disposed extension 21 constituting an indicator for association with the setting scale on the disc 19. The structure 18 includes a thermostatic expansible and contractible element 22 fixed on the inner end of the stem 17 and carrying a point 23. Associated with the point 23 is a point 24 extended from a spring controlled circuit closer (not shown) mounted in a block 26 and interposed in the heating circuit. The structure 18 is set so that the contact point 23 will act on the point 24 to an extent whereby the circuit closer will be held in a position to close the heating circuit. The structure 18 is set for a predetermined temperature. When the temperature in the brooder extends above the point which the structure 18 is set for, the latter will be acted upon by the heat whereby it will function to move contact 23 clear of contact 24 resulting in the opening of the heating circuit. The latter will remain open until the temperature in the brooder has been reduced to a point to provide for the structure 18 acting to bring contact 23 into engagement with contact 24 thereby closing the heating circuit. The block 26 is carried by a frame 27 supported within the canopy. The frame 27 carries an arm 28 formed with an offset part having a threaded opening. Stem 17 has peripheral threads 29 for engagement with the threads of the wall of the opening of the arm 28 for maintaining structure 18 in its adjusted or set position. It is to be understood that a thermostatically controlled structure other than that which is shown may be employed. The circuit connections of the heating circuit which are associated with the circuit closer are indicated at 30, 31. The portion 11 of the section 8 has connected thereto a grommet 32 for the passage of power line connections 33 from which extend not only heating circuit connections, but also lighting circuit connections to be referred to.

The section 9, as well as the section 10, includes an inwardly extending, upwardly inclined, trapezoidal portion 34 terminating at its bottom in a depending vertically disposed rectangular flange 35 having an inset bottom 36. The portion 34 of the section 9 at its upper end terminates in a vertically disposed flange 37 of inverted U-shape in vertical section. The portion 34 of the section 10 terminates at its top into a vertically disposed flange 38 which extends into the flange 37. The latter and flange 38 are secured together by the holdfast devices 39.

The portions 34 of the sections 9, 10 are provided at their ends with flanges 40 which overlap sections 7, 8. The portions 11 of the sections 7, 8 have their sides provided with flanges 41 which bear on the ends of the inner faces of the portions 34 of the sections 9, 10. The sections 7, 8, 9 and 10 are secured together by holdfast devices 42.

The flanges 12 of the sections 7, 8 have secured to their outer faces a plurality of spaced plates 43 provided at their lower ends with barrels 44. These latter are arranged above the bottoms of the flanges 12. The outer face of the flanges 35 of the sections 9, 10 have secured to their outer faces a series of spaced plates 45 provided at their lower ends with barrels 46. These latter are arranged above the bottoms of flanges 34.

Each corner post 4 has the legs 5, 6 thereof, near their upper ends provided with outset portions 47, 48 respectively to form grooves 49, 50 respectively, opening at the free side edges of the legs. The grooves 49 align with the barrels 46. The grooves 50 align with the barrels 44.

The canopy includes a pair of side walls and a pair of end walls. Each side wall and each end wall consists of a rigid stationary upper section and a shiftable lower section. The stationary upper sections of the end walls are provided by the flanges 12. The stationary upper sections of the side walls are provided by the flanges 35. The upper portions of the shiftable lower sections of the end and side walls are arranged exteriorly of the lower portions of the stationary upper sections of the end and side walls. The shiftable lower sections of the end walls of the canopy are oppositely disposed, are of like form and are indicated at 51, 52. The shiftable lower sections of the side walls of the canopy are oppositely disposed, are of like form and are indicated at 53, 54. The length of the shiftable sections of the side and end walls is less than that of the length of the stationary sections of the side and end walls. Each corner leg is secured to a stationary section of an end wall by the holdfast devices 55 and to a stationary section of a side wall by the holdfast devices 56. Each shiftable section of a side or end wall is disposed between legs of a pair of opposed corner posts. The shiftable sections of the side walls are of greater length longitudinally than the shiftable sections of the end walls of the canopy.

Each shiftable end wall section consists of an oblong rigid plate 57 provided at its top with a series of spaced barrels 58 which align with and have the barrels 44 interposed between them. The plate 57 at each end is formed with an integral substantially quadrangular inwardly extending rigid end member or wing 59 having a corrugated lower portion 60. The bottom of plate 57 has an inturned flange 61. Secured to the inner face of plate 57 is a series of spaced angle-shaped spring clamps 62 which oppose and coact with the flange 61 for coupling a rod 63 to the bottom of said plate 57. The rod 63 has secured thereto a series of depending flexible overlapping wall or confiner members forming extensions of the plate 57. The number of wall members depends upon the length of plate 57 and by way of example, the plate 57 is shown as associated with an inner wall member 63$^a$ and a pair of outer wall members 64, 65. The wall member 63$^a$ is of rectangular contour. The wall members 64, 65 are of right angular form and one part thereof, indicated at 66, extends inwardly from the other part 67 thereof. The said part 67 is the outer part of a member 64 or 65. The parts 66 of members 64, 65 are arranged against the inner faces of the end members 59 and connect to the latter as at 68. A pintle 69 connects the barrels 58 of a plate 57 to the barrels 44 of the plates 43. The pintle 69 is of greater length than plate 57 and extends into a pair of opposed grooves 50. The pintle 69 in connection with the barrels 44, 58 and grooves 50 pivotally connect the shiftable section of an end wall of the canopy. There is associated with corrugated portions 60 of the end members 59 of a plate 57, latching means 70 carried by the legs 6 of a pair of corner posts for the purpose of latching the shiftable end wall section in extended and non-extended position. When the shiftable end wall section is extended, the members 63a, 64 and 65 will be vertically disposed and depend from the bottom of the plate 57 of said shiftable section. The plates 57 are of less length than the flanges 12 and are arranged between the legs 6 of the corner posts.

Each shiftable side wall section consists of an oblong rigid plate 71 provided at its top with a series of spaced barrels 72 which align with and have the barrels 46 interposed between. The plate 71 at each end is formed with an integral substantially quadrangular inwardly extending rigid end member or wing 73 having a corrugated lower portion 74. The bottom of plate 71 has an inturned flange 75. Secured to the inner face of plate 71 is a series of spaced angle-shaped spring clamps 76 which are spaced from and coact with the flange 75 for coupling a rod 77 to the bottom of plate 71. The rod 77 has secured thereto a series of depending flexible overlapping wall or confiner members consisting of a set of intermediate members 78 and a pair of end members 79, 80. The end members 79, 80 are of angle form and each consists of an outer part 81 and an inwardly extending part 82. The inwardly extending parts 82 are secured to the inner faces of the members 73 by the attaching means 83. A pintle 84 extends through the aligning barrels 72, 46 of the plate 71. The pintle 84 is of greater length than the plate 71 and the end portions thereof are arranged in a pair of opposed grooves 49 of the legs 5 of the corner pieces. The pintle 84, in connection with the barrels 46, 72, provides for pivotally connecting a shiftable section to the stationary section of a side wall of the canopy. There is associated with the corrugated lower portions of end members 73 of a plate 71 latching means 85 carried by the legs 5 of the corner posts for the purpose of latching a shiftable section of a side wall in extended and non-extended positions. When the plates 71 are adjusted outwardly, the wall members 78, 79 and 80 are suspended from the outer ends of said plates, are disposed vertically and form continuations of plates 71.

The plates 71 are of less length than the flanges 35, but of greater length than the plates 57. The plates 71 are arranged between the legs 5 of the corner pieces. Each plate 71 is formed with two spaced sets 86, 87 of spaced window openings and each set is closed by a transparent panel 88 secured as at 89 against the inner faces of said canopy.

There is associated with each corner post an angle-shaped extension member 90 formed at its center with openings 91 for selectively receiving a releasable holdfast means 92 which extends through the corner post at the point of mergence of the legs of the latter. The extension 90 is positioned against the inner face of corner post 4. The extensions 90 are adjustable relative to the corner posts and are provided for elevating the canopy 1 to the desired extent when desired. The extensions 90 are secured in adjusted position by the holdfast means 92.

When the shiftable sections of the side and end walls of the canopy are extended, the brooding area under the brooder is increased.

The portion 34 of the section 9 of the canopy carries a plug 93 for an electric lamp 94 which constitutes a signal and when illuminated indicates that the heating circuit is closed.

The inner face of the portions 2 and 3 of canopy 1 is provided with a lining of insulating material 94a, preferably asbestos. Arranged within and secured to the inner face of canopy 1 are oppositely disposed angle-shaped spaced supports 94b having inturned parts 94c at their lower ends which seat on and extend inwardly from the inturned parts 36 of the flanges 35. The lining 94a is apertured in the same manner as the top of canopy 1.

The brooder includes a substantially corrugated inner canopy or partition 95 which coacts with the sides and ends of canopy 1 to provide a brooder space or chamber. The inner canopy or partition 95, hereinafter termed partition, is suspended within canopy 1 from the inturned parts 94c of the supports 94b by a means to be referred to. The partition 95 is formed from sheet metal and is of rectangular contour in plan. The partition 95 includes a pair of oppositely disposed downwardly inclined side portions 96, 97, a V-shaped intermediate portion 98 of materially greater width than that of either side portion and having its parts 99, 100 disposed in oppositely upwardly inclined relation terminating at the tops of the side portions 96, 97, respectively, triangular-shaped end portions 101 anchored to the ends of said intermediate portion, bends 102, 103, 104, spaced channel-shaped reinforcing members 105, 106 and oppositely extending angle-shaped suspension members 107.

The members 107 are secured to and extend from the side portions 96, 97 of partition 95 to and seat on the upper faces of the inturned parts 94c of the supports 94b. The members are anchored to the parts 94c by the holdfast means 108. The supports 94b and members 107 coact to suspend partition 95 in canopy 1. The end portions 101, as well as the ends of the side portions 96, 97 are spaced from the flanges 12 and inturned part 13. The intermediate portion 98 has its center substantially in the same plane as the inturned parts 13 and 36 of the flanges 12, 35 respectively. The side portions 96, 97 at their bottoms have depending reinforcing flanges 109, 110 respectively which are maintained in spaced relation to the flanges 35 by the suspension members 107. The parts 99, 100 of the intermediate portion 98 are formed with grommets 111, 112 respectively. The intermediate portion 98 at its lengthwise center is formed with a pair of spaced aligning plugs 113, 114, each arranged between the transverse median and one end of portion 98. The plugs 113, 114 have depending therefrom electric lamps 115, 116 respectively. The reinforcing members 105, 106 have their ends secured to the bends 102, 104.

Anchored to the lower face of partition 95 at the bends 102 is a plurality of spaced parallel hangers 117 for suspending an elongated electric heating element 118 which is of slightly less length than and is disposed in lengthwise relation with respect to partition 95. Heating circuit connections 119 extend through the grommet 111 to element 118. Anchored to the lower face of partition 95 at the bend 104 is a plurality of spaced parallel hangers 120 for suspending an elongated electrical heating element 121 which is of slightly less length than and is disposed in lengthwise relation with respect to partition 95. Heating circuit connections 122 extend through the grommet 112 to element 121. The elements 118, 121 are arranged in parallel spaced relation, disposed in proximity to the sides and extend in proximity to the ends of canopy 1.

The top of canopy 1 at one end has a series of ventilating openings 123 which are controlled by an adjustable apertured ventilator 124 pivotally connected to the outer face of the said end. The part 100 of the intermediate portion 98 of partition 95 has an opening 125 for the passage of stem 17 of the thermostat. The frame 27 has an extension 126 which is anchored to the said part 98. The lighting circuit connections for the lamps 115, 116 are indicated at 127, 128 respectively.

With reference to Figures 7 and 8, a modified form of shiftable wall section is illustrated. The modification is shown by way of example as relating to the shiftable section of an end wall, but the shiftable section of a side wall will be constructed in the same manner as the shiftable section shown for an end wall. The said shiftable wall section generally indicated at 129 is of the extension type and includes a pair of plates 130, 131. The plate 130 is folded upon itself at its sides to form combined guides and frictional latches 132 in which the sides of the plate 131 are mounted. The plate 131 is extendible relative to plate 130 and in this connection attention is directed to Figure 7. The plate 130 has its top formed with a barrel 133 through which extends a pintle 134 having its end terminal portions journaled in the grooves 50 of the legs 6 of a pair of opposed corner posts. The plate 131 has connected thereto, as at 135 flexible overlapping wall or confiner members 136. The plate 131 is arranged against the lower face of plate 130.

The partition 95 in connection with the top of canopy 1 provides an air chamber 145 and in connection with the side and end portions of the canopy 1 forms a brooding chamber or area 146. The chamber 145 opens at its sides and ends into the chamber 146 and may be termed a dead air chamber. Outlet of air from the chamber 145, when desired, may be provided for by adjusting the ventilator 124. The inner canopy or partition functions as a deflector and is formed of a V-shaped portion and a pair of inverted V-shaped portions. The outer legs of the inverted V-shaped portions are of less length than the inner legs thereof. The legs of the V-shaped portion are of the same length. The inverted V-shaped portions form the lower face of the partition with a pair of spaced parallel V-grooves or channels. The V-shaped portion provides the upper face of the partition with a V-groove or channel of greater width and depth than the said other grooves or channels. The heated air emitted from the heating elements naturally follows the lines of least resistance which is upwards. In order to bring the heated air downwardly towards the center of the brooding chamber or area the V-shaped intermediate portion of the partition is employed. Extending outwardly from the heating element are the downwardly inclined side portions of the partition which direct the heated air towards the sides of the brooder. The heating elements are placed in proximity to the sides of the brooder, the point where the heated air is most needed and from where it will gradually drift towards the center because of the greater atmospheric pressure on the outside. The heating elements are suspended in the inverted V-grooves or channels and the heated air rising from these elements in said channels follows the channels to the ends of the brooding chamber, thus providing a generous supply to the corners and sides of the brooder. The form of the partition and the arrangement of the heating elements relative to the latter provides uniform heated air to all areas under the brooder. Heat is allowed to circulate to that portion of the brooder above the partition through a continuous opening between the partition and the sides and ends of the outer canopy. That portion of the brooder holds the heated air and provides a blanket of heated air over the entire brooding chamber and in connection with the asbestos lining provides adequate insulation.

The heated air following the intermediate V-portion of the partition is forced down towards the middle where it naturally breaks and causes an air current which returns to the heating elements or makes a complete cycle whereby air circulation is provided under the hover for the chicks.

What we claim is:—

1. A brooder for chicks including an upstanding structure open at its bottom and formed of a hollow closed top and side and end walls depending from said top, spaced means connected at their upper ends to the corners of and for supporting said structure, a horizontal partition within said structure and having a portion extending into the lower part of said top and its remaining portion surrounded by said walls, said partition being formed of a pair of oppositely extending downwardly inclined side portions and a V-shaped central portion having the upper ends of its sides merging into the upper ends of said side portions, the said side walls of said structure and the said side portions of said partition having coacting means for suspending the partition within and in spaced relation to the top and walls of said structure, electrical heaters suspended from said partition at the points of mergence of the upper ends of the said central portion with the upper ends of the said side portions, and depending sectional extendible elements, each including an adjustable rigid upper section hinged to one of said walls and having inturned tapered ends and a flexible lower section carried by its upper section, said elements coacting with the walls of said structure and with the said partition to provide a variable area brooding chamber, each of said elements being arranged between a pair of the said spaced supporting means for said structure.

2. A brooder for chicks including an upstanding structure open at its bottom and formed of a hollow closed top and side and end walls depending from said top, angle-shaped corner pieces connected at their upper ends to the corners of and for supporting said structure, a horizontal partition within said structure and having its upper portion extending into the lower part of said top and its lower portion surrounded by said walls, said partition being formed of a pair of oppositely extending downwardly inclined side portions and a V-shaped central portion having the upper ends of its sides merging into the upper ends of said side portions, the said side walls of said structure and the said side portions of said partition having coacting means for suspending the partition within and in spaced relation with the top and the walls of said structure, electrical heating means suspended from said partition at the points of mergence of the central portion of the partition with the side portions of the latter, and depending sectional side and end wall continuation elements hinged to the walls of said structure and arranged between and adjustably connected to said corner pieces, said wall continuation elements in connection with the walls of said structure, the angled pieces and the said partition coacting to provide a brooding chamber, and said wall continuation elements being so formed to provide for the extending and adjusting thereof for varying the area of the brooding chamber.

3. A brooder for chicks including an upstanding structure open at its bottom and formed of a hollow closed top and side and end walls depending from said top, spaced means connected at their upper ends to the corners of and for supporting said structure, a horizontal partition within said structure and having a portion extending into the lower part of said top and its remaining portion surrounded by said walls, said partition being formed of a pair of oppositely extending downwardly inclined side portions and a V-shaped central portion having the upper ends of its sides merging into the upper ends of said side portions, the said side walls of said structure and the said side portions of said partition having coacting means for suspending the partition within and in spaced relation to the top and walls of said structure, electrical heaters suspended from said partition at the points of mergence of the upper ends of the said central portion with the upper ends of the said side portions, depending sectional extendible elements, each including an adjustable rigid upper section hinged to one of said walls and having inturned tapered ends and a flexible lower section carried by its upper sections, said elements coacting with the walls of said structure and with the said partition to provide a variable area brooding chamber, each of said elements being arranged between a pair of the said spaced supporting means for said structure, upstanding closures anchored to the ends of said V-shaped portion, and spaced braces connecting together the points of mergence of said V-shaped portion with said side portions.

4. A brooder for chicks including an upstanding structure open at its bottom and formed of a hollow closed top and side and end wall forming means, corner pieces connected at their upper ends to the upper portion of said wall forming means for supporting said structure, a horizontal partition within said structure and having its upper portion extending into the lower part of said top and its lower portion surrounded by the upper part of said wall forming means, said partition being formed of a pair of oppositely extending downwardly inclined side portions and a V-shaped central portion having the upper ends of its sides merging into the upper ends of the said side portions, certain of the said wall forming means and the said side portions of said partition having coacting means for suspending the partition within and in spaced relation with the top of and the walls of said structure, electrical heating means suspended from said partition at the points of mergence of the said V-shaped central portion with the said side portions, said wall forming means in connection with said partition providing a brooding chamber, and spaced means on said partition and in connection with the latter and said top forming a dead air receiving chamber, the said side portions coacting with the sides of said top to form passages leading from the brooding chamber to the dead air chamber.

5. A brooder for chicks including an upstanding structure open at its bottom and formed of a hollow closed top and side and end walls depending from said top, angle-shaped corner pieces connected at their upper ends to the corners of and for supporting said structure, a horizontal partition within said structure and having its upper portion extending into the lower part of said top and its lower portion surrounded by said walls, said partition being formed of a pair of oppositely extending downwardly outwardly inclined side portions and a V-shaped central portion having the upper ends of its sides merging into the upper ends of said side portions, the said side walls of said structure and the said side portions of said partition having coacting means for suspending the partition within and in spaced relation with the top and the walls of said structure, electrical heating means suspended from said partition at the points of mergence of the central portion of the partition with the side portions of the latter, and depending sectional side and end wall continuation elements hinged to the walls of said structure and arranged between and adjustably connected to said corner pieces.

6. A brooder for chicks including an upstanding structure open at its bottom and formed of a hollow closed top and side and end walls depending from said top, angle-shaped corner pieces connected at their upper ends to the corners of and for supporting said structure, a horizontal partition within said structure and having its upper portion extending into the lower part of said top and its lower portion surrounded by said walls, said partition being formed of a pair of oppositely extending downwardly outwardly inclined side portions and a V-shaped central portion having the upper ends of its sides merging into the upper ends of said side portions, the said side walls of said structure and the said side portions of said partition having coacting means for suspending the partition within and in spaced relation with the top and the walls of said structure, electrical heating means suspended from said partition at the points of mergence of the central portion of the partition with the side portions of the latter, and depending sectional side and end wall continuation elements hinged to the walls of said structure and arranged between and adjustably connected to said corner pieces, said V-shaped portion having the transverse cross sectional length thereof materially greater than the transverse cross sectional length of either of said side portions.

7. A brooder for chicks including an upstanding structure open at its bottom and formed of a hollow closed top and side and end wall forming means, corner pieces connected at their upper ends to the upper portion of said wall forming means for supporting said structure, a horizontal partition within said structure and having its upper portion extending into the lower part of said top and its lower portion surrounded by the upper part of said wall forming means, said partition being formed of a pair of oppositely extending downwardly outwardly inclined side portions and a V-shaped central portion having the upper ends of its sides merging into the upper ends of the side portions of the partition, certain of the said wall forming means and the said side portions of said partition having coacting means for suspending the partition within and in spaced relation with the top and the walls of said structure, electrical heating means suspended from said partition at the points of mergence of the V-shaped central portion of the partition with the side portions of the latter, said wall forming means in connection with said partition providing a brooding chamber, and spaced means on said partition and in connection with the latter and said top forming a dead air receiving chamber, the said side portions coacting with the sides of the top to provide passages leading from said brooding chamber to said other chamber, the said wall forming means having parts arranged between said corner pieces, said parts being so formed to provide for the extension and adjusting thereof to vary the area of the lower portion of the brooding chamber, and said parts being adjustably connected to said corner pieces.

8. A brooder for chicks of that type including a brooding chamber and a dead air chamber arranged over and permanently communicating with said other chamber, said brooder including a horizontally disposed suspended structure of less length and width than the length and width of said chambers, said structure providing the top and bottom respectively of said brooding and dead air chambers and comprising a partition formed of a V-shaped central portion and a pair of oppositely disposed depending outwardly inclined side portions merging at their upper ends into the upper ends of the sides of said central portion, a pair of upstanding end closures for the ends of said V-shaped portion, and spaced braces for connecting together the points of mergence of said side portions with said central portion.

9. A brooder for chicks of that type including a brooding chamber and a dead air chamber arranged over and permanently communicating with said other chamber, said brooder including a horizontally disposed suspended structure of less length and width than the length and width of said chambers, said structure providing the top and bottom respectively of said brooding and dead air chambers and comprising a partition formed of a V-shaped central portion and a pair of oppositely disposed depending outwardly inclined side portions merging at their upper ends into the upper ends of the sides of said central portion, a pair of upstanding end closures for the ends of said V-shaped portion, and spaced braces for connecting together the points of mergence of said side portions with said central portion, the transverse cross sectional length of said V-portion being greater than the transverse cross sectional length of either side portion.

HOWARD S. BREMBECK.
PAUL J. SPEICHER.